(12) United States Patent
Grendene

(10) Patent No.: US 6,778,367 B1
(45) Date of Patent: Aug. 17, 2004

(54) METHOD AND DEVICE FOR DETECTING THE BLOCKING OF A STEPPER MOTOR

(75) Inventor: Bruno Grendene, Morsang/Orge (FR)

(73) Assignee: Valeo Climatisation, La Verriere (FR)

( * ) Notice: Subject to any disclaimer, the term of this patent is extended or adjusted under 35 U.S.C. 154(b) by 515 days.

(21) Appl. No.: 09/916,650

(22) Filed: Jul. 30, 2001

(30) Foreign Application Priority Data

Aug. 3, 2000 (FR) .......................................... 00 10249

(51) Int. Cl.[7] ............................ H02H 7/08; G05B 5/00
(52) U.S. Cl. ........................................ 361/33; 318/474
(58) Field of Search .................... 361/23, 33; 318/135, 318/254, 138, 685, 696, 439, 460, 466, 467, 474

(56) References Cited

U.S. PATENT DOCUMENTS

| | | | |
|---|---|---|---|
| 4,507,598 A | 3/1985 | Wakabayashi et al. | ...... 318/687 |
| 5,514,939 A | * 5/1996 | Schlager et al. | ............ 318/254 |
| 5,793,173 A | 8/1998 | Henschel et al. | ........... 318/467 |
| 6,111,380 A | * 8/2000 | Munz et al. | ................. 318/474 |
| 6,512,341 B2 | * 1/2003 | Matsushiro et al. | ........ 318/254 |
| 6,633,145 B2 | * 10/2003 | Shao et al. | .................. 318/254 |

FOREIGN PATENT DOCUMENTS

| | | | |
|---|---|---|---|
| DE | 34 09300 | 12/1984 | ........... C03B/33/02 |
| EP | O 458 159 A1 | 11/1991 | ............. H02P/8/00 |
| WO | WO 97/37425 | 10/1997 | ............. H02P/6/18 |

* cited by examiner

Primary Examiner—Ronald W. Leja
(74) Attorney, Agent, or Firm—Liniak, Berenato, White

(57) ABSTRACT

The invention relates to a method of detecting the blocking of a three-phase stepper motor featuring three coils, characterised in that, with the stepper motor having its coils connected in star mode, with a common terminal (P), it implements a detection of a said blocking of the rotor of the motor, by supplying two of the said coils (A, B) with electricity in such a way that they are traversed by a current, and by measuring the voltage at an end terminal of the third coil (C). A comparison of the measured voltage is carried out with at least one given threshold.

11 Claims, 4 Drawing Sheets

METHOD AND DEVICE FOR DETECTING THE BLOCKING OF A STEPPER MOTOR

FIELD OF THE INVENTION

The present invention relates to a method and a device for detecting blocking of a three-phase electric stepper motor.

BACKGROUND OF THE INVENTION

It applies especially, but not exclusively, to the applications of this type of motor in a motor vehicle, and more particularly for their mounting on the mechanical flaps for airflow control in air-conditioning systems.

It transpires that stepper motors, in their function, generally perform a limited movement between two extreme positions called end stops.

It is important for problems of noise and of wear of the kinematics that an end-stop position be detected so as not to continue with the motion.

In addition to forcing onto the end-stop limit position, this may give rise, when the torque is abruptly released, to a rebound on the end stop by the element moved by the stepper motor, for example an airflow-control flap. The function of leaktightness is then no longer ensured.

The end-stop detection also makes it possible to ensure that the flap is present at this limit position and to carry out self-adjustment, that is to say that it makes it possible to define the instantaneous position precisely.

In fact, stepper motors are widely used nowadays in open-loop. All that happens is that a sequencing is sent in order to position the actuator consisting of the rotor of the motor. However, it is not possible to guarantee that the latter is actually in the desired position. A loss of stepping motion may occur due, for example, to blockage of the kinematics.

End-stop detection makes it possible to know when the actuator moved by the motor of the flap arrives in its two end positions, and thus to resynchronise the drive to the actual position of the element being moved. Nowadays this compensation for loss of step motion is done, in the majority of cases, by sending a drive demand for positioning at 105% (100% corresponding to the arrival at the end stop if the actuator is correctly positioned with no loss-of step motion). This regains 5%, on each occasion, of the range of travel of any losses of step motion, but this generates noise by forcing onto the end stop because of this 5% additional travel. Moreover, this method cannot rapidly compensate for a large loss of step motion.

It is therefore desirable to modify the end-stop detection in order to improve the current situation.

Devices exists nowadays for detecting the end stop. Nevertheless, they are applied only to conventional single-pole motors (4 coils) and two-pole motors (2 coils).

These devices therefore do not make it possible to obtain implementation of the operation of end-stop detection with a three-phase stepper motor.

A first object of the invention is a method and a device being applied to a new type of three-phase stepper motor (3 coils).

Another object of the invention is to obtain end-stop detection effectively and at low cost, and in particular to achieve end-stop detection with the aid of electronics which are simple and easy to implement, at low cost, and more particularly to allow the electronics to be shifted onto the actuator, which enhances the performance of the system and is an answer to the problem of overloading of the resources of the central device (microcontroller or ASIC, for example) which controls the actuators.

Another object of the invention is to make it possible to detect the blocking of the rotor of the motor rather than the induced effects occurring after the rebound on the end stop by the element which is moved by the rotor of the actuator.

Another object of the invention is to make it possible to circumvent the problems hindering detection, with the aid of computer means.

Another object of the invention is to obtain end-stop detection with compensation for the influence of the variations in supply voltage on this detection.

SUMMARY OF THE INVENTION

At least one of the objects of the invention is obtained with the aid of a method of detecting the blocking of a three-phase stepper motor featuring three coils, characterised in that, with the stepper motor having its coils connected in star mode, with a common terminal, it implements a detection of a said blocking of the rotor of the motor, by supplying two of the said coils with electricity in such a way that they are traversed by a current, and by measuring the voltage at an end terminal of the third coil, as well as by carrying out a comparison of the voltage measured with at least one given threshold.

The said comparison may be carried out with a maximum threshold and/or a minimum threshold.

The method may be characterised in that the coils are supplied from their terminal opposite the said common terminal, and in that, in order to carry out the said detection, a first terminal is taken to a first supply voltage, a second terminal is taken to a second supply voltage, and a third terminal is coupled to a voltage-measuring device.

The said measurement may be carried out by sampling.

This sampling may be carried out offset in time by comparison with a motor-step drive in order to avoid the peaks due to switching-over to the high-impedance state, the said offset being chosen in such a way as to identify motor-rotor blocking. The signal representative of the rotor blocking precedes the signals corresponding to any rebound by an element driven by-the motor, for example a flap. That being so, the end-stop detection is earlier and becomes more independent of the element driven by the motor.

The invention also relates to a device for detecting the blocking of a three-phase stepper motor, characterised in that it includes:

an electronic module for supplying the motor in star mode, an electronic blocking-detection module for supplying two coils of the motor in such a way that they are traversed by a current while a third coil is coupled to a measurement input of the electronic module.

The electronic supply module and/or the electronic detection module can be controlled by a device such as a microcontroller associated with the stepper motor. The microcontroller receives signals, for example for positional drive of the motor, from a central drive microcontroller, and generates the stepping drive and/or the end-stop detection.

DESCRIPTION OF THE PREFERRED EMBODIMENTS

Figure 1:
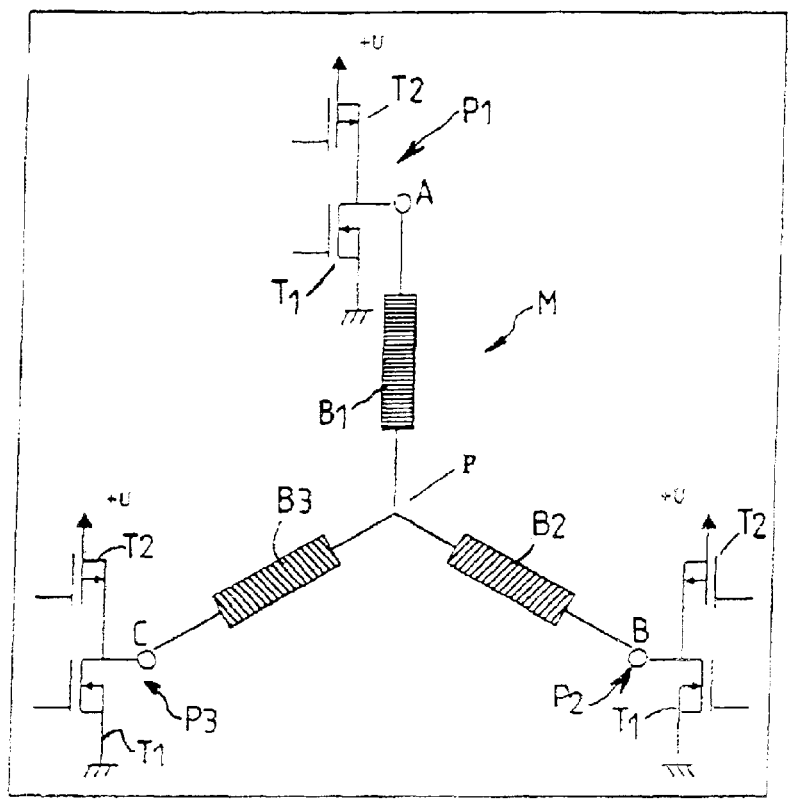
FIG. 1 diagrammatically represents a three-phase motor, with its control electronics.

FIG. 1 shows a three-phase motor M on which the method can be applied. The motor consists of three coils B1 to B3 of the same impedance, linked together at a mid-point P and arranged in star mode. The passage of current through these coils is achieved via three half-bridges in "H" configuration, P1 to P3, each consisting of two transistors T1 and T2: one, T1, for an earthed drive and the other, T2, for a drive at the supply voltage U of each of the half-bridges P1 to P3.

Figure 2:
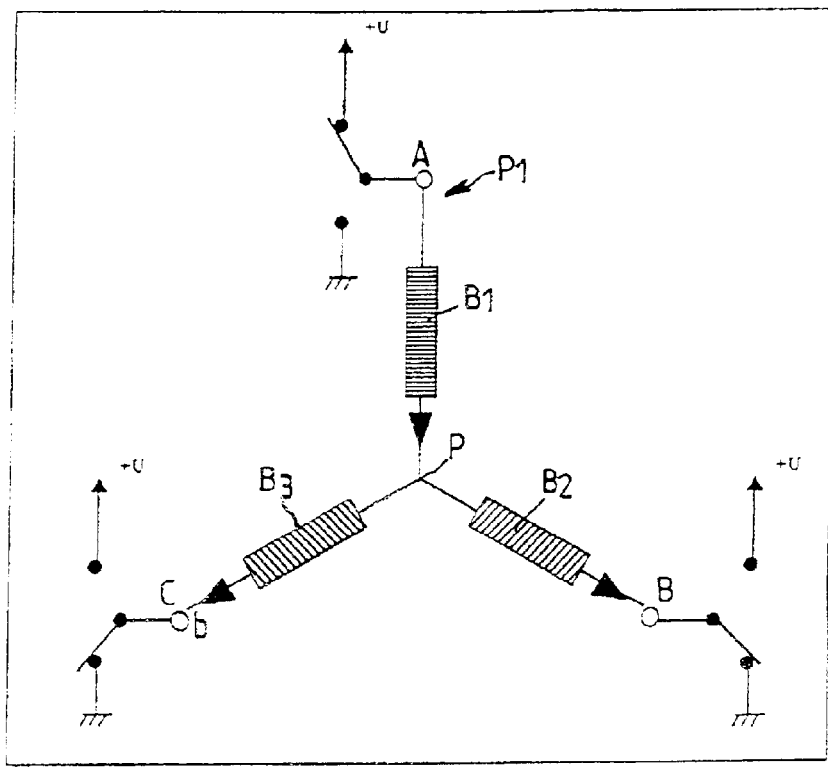
FIG. 2 symbolically shows a state of the drives and the passage of current through the 3 coils of this motor.

FIG. 2 shows the state of the 3 drives for making the current pass in the three coils B1 to B3 of the motor M represented in its configuration of FIG. 1. Two half-bridges (for example P2 and P3) are taken to earth and the third (P1 in this case) is taken to the supply voltage U.

Figure 3:
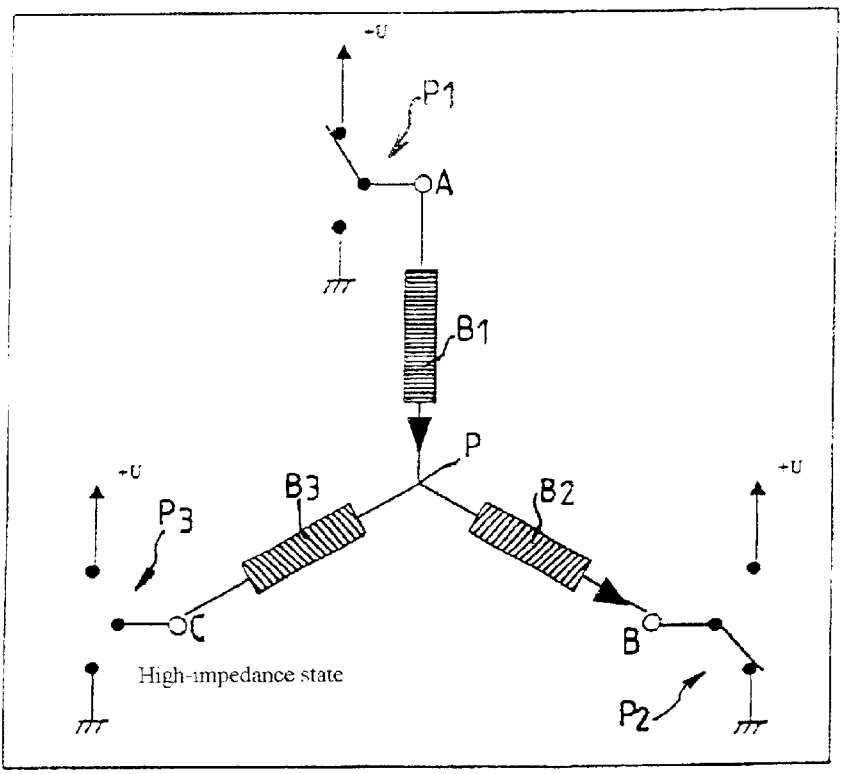
FIG. 3 symbolically shows one state of the drives and the passage of current, through two coils only, with a high-impedance level being employed for the third coil.

FIG. 3 represents the same motor, but in a state in which the current passes only in 2 of the 3 coils. In this configuration, one half-bridge, for example P1, is taken to the voltage U, one half-bridge, for example P2 is earthed, and the third, therefore P3, is placed into a high-impedance state, and is not traversed by a current.

When none of the transistors T1, T2 of a half-bridge, here P3, is driven, the corresponding coil B3 no longer has a voltage level imposed via its drive and the terminal C opposite the midpoint P is in the said high-impedance state. The voltage present at this terminal C becomes representative of the voltage level at the mid-point P.

In this illustrative example, called high impedance on the drive, it is possible, via the coil which is no longer driven (B3 in the example above) to view the behaviour of the other two coils (B1, B2) at the midpoint P.

It is on the basis of this state that it is possible to analyse the signal and to detect the presence of an end stop.

Figure 4:
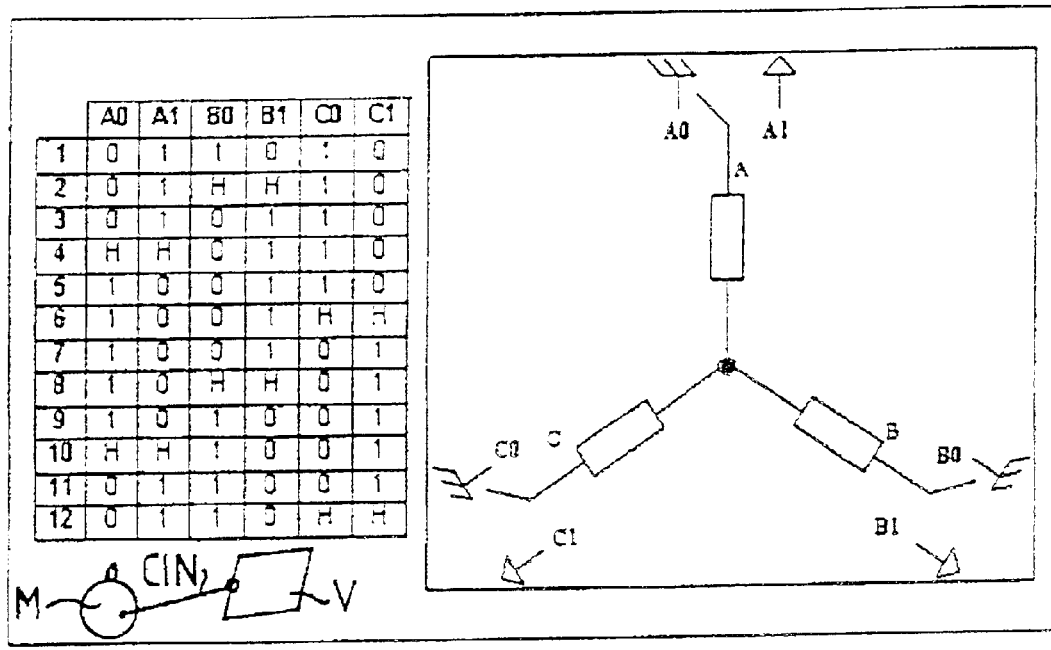
FIG. 4 diagrammatically illustrates the various states (represented in FIGS. 2 and 3) to be linked to-gether from 1 to 12 in order to be able to make the motor turn.

FIG. 4 shows the state in which the transistors T1 and T2 of the various half-bridges have to be so that the rotor of the motor M starts to turn and, via kinematics (CIN), moves one or more elements, for example a flap V. The states bearing an odd number are in accordance with the state of FIG. 2, whereas the states having an even number are in accordance with the state of FIG. 3. The letter H symbolises a high-impedance state of the drive of a coil, 0 represents being earthed, +U represents being taken to the supply voltage.

The arrival at the end stop can be sampled, for example, every six drive steps of the motor M.

The choice of a single coil (for example B3) is sufficient to carry out end-stop detection. With the choice of the coil made, the signal present on its drive, when it is at high impedance, is analysed by software. To that end, the terminal C of the coil B3, on which this signal is available, is coupled electrically to analysis, electronics comprising appropriate software.

Figure 5:
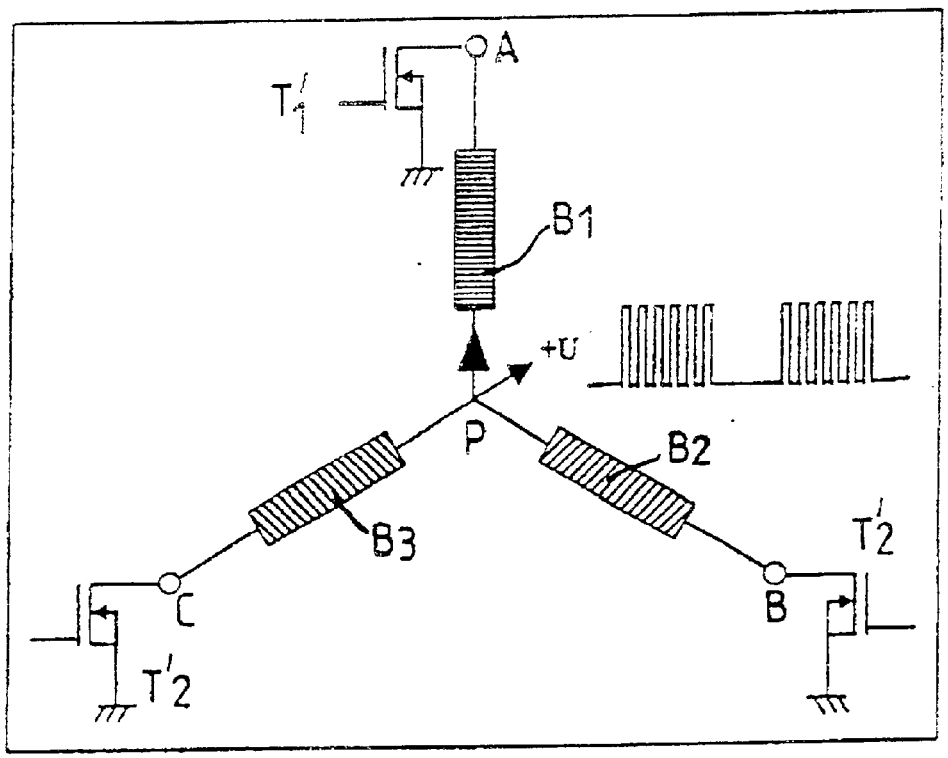
FIG. 5 diagrammatically illustrates the device of the three-phase motor, with another control electronics.

FIG. 5 represents another way of controlling the motor. This time, the midpoint receives the supply voltage of the motor. Each of the terminals A, B, C of the coils B1, B2, B3 is coupled to one transistor, T'1, T'2, T'3, respectively. A high-impedance state is obtained by taking the terminal B of two coils (for example B1 and B2) to the earth potential, the terminal C of B3 then being in a high-impedance state.

In contrast, in both cases, it is possible for the supply voltage to be present in the form of a train of pulses, for example for pulse-width modulation (PWM). The frequency of this train hinders the analysis of the end-stop detection. It is necessary, in this case, to interrupt the train of pulses due to the switching on the coil and to generate a high-impedance state on the chosen coil, and to carry out the detection during a period of time necessary for the sampling of the voltage serving for the analysis. This time, of about 2 milliseconds, for example every 100 milliseconds for a motor driving a flap, does not in any way disturb the control nor the performance of the motor M. The interval between two samplings is chosen to allow it to be detected that the rotor of the motor M has arrived at the end stop.

Figure 8:
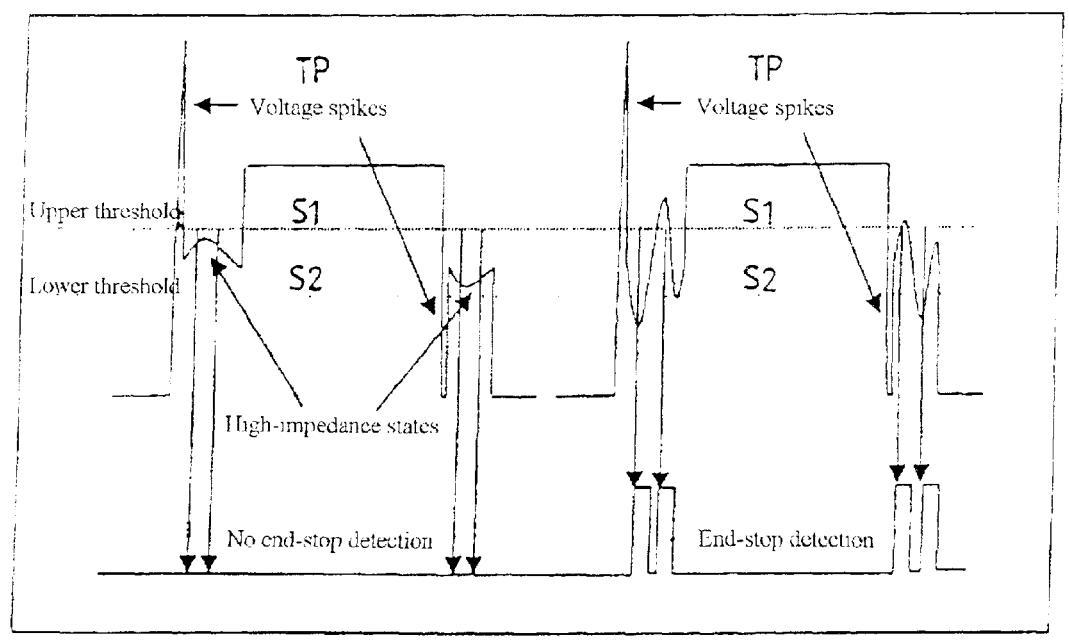
FIG. 8 shows the form of the signals with and without end-stop detection, as well as the detection threshold or thresholds.
Figure 6:
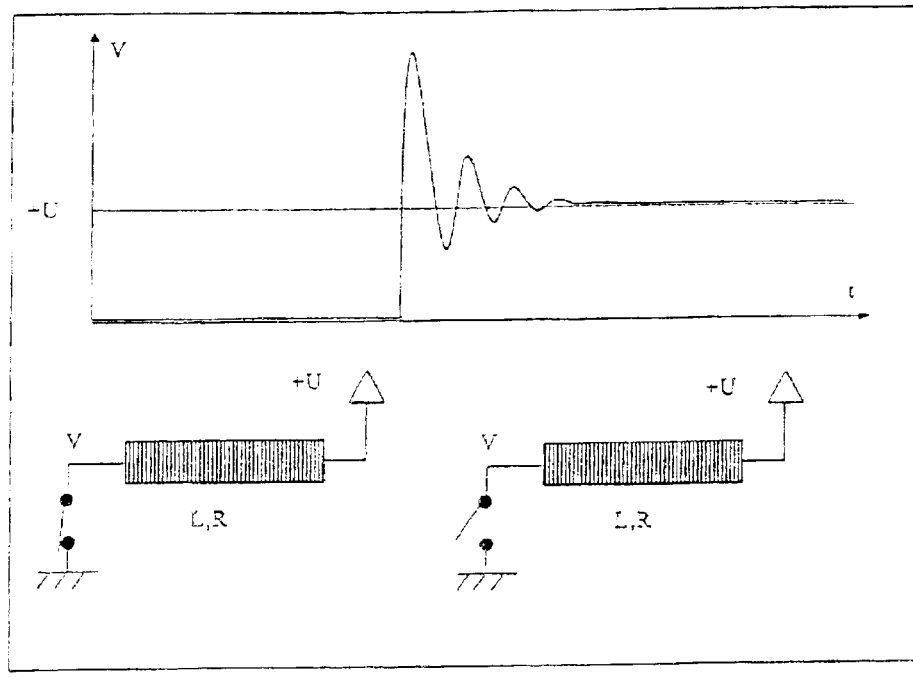
FIG. 6 diagrammatically illustrates the characteristic form of the signal on the drive to the coil, upon switching from one fixed state to a high-impedance state.

FIG. 6 shows the form of the voltage upon a switching to a high-impedance state (FIG. 3 or FIG. 6). An end stop is never perfect, in the sense that no "soft" impact ever occurs. A mechanical rebound occurs. This is all the greater on an air-conditioning system because of the sealing lips. They constitute an elastic system. When the flap arrives at the end stop, there comes a moment when the motor M can no longer combat the spring effect due to this elasticity of the end stop. The flap is therefore sent back in the direction opposite to the demanded direction, which causes an oscillation within the motor M. The stored mechanical energy generates an induced electromotive force which produces a sinusoidal voltage. This sinusoidal voltage thus generated is visible on the control voltage (c.f. FIG. 8).

In such a case, the torque applied to the motor M can be relaxed, for example by progressively altering the duty cycle of the pulse-width drive (PWM).

Figure 7:
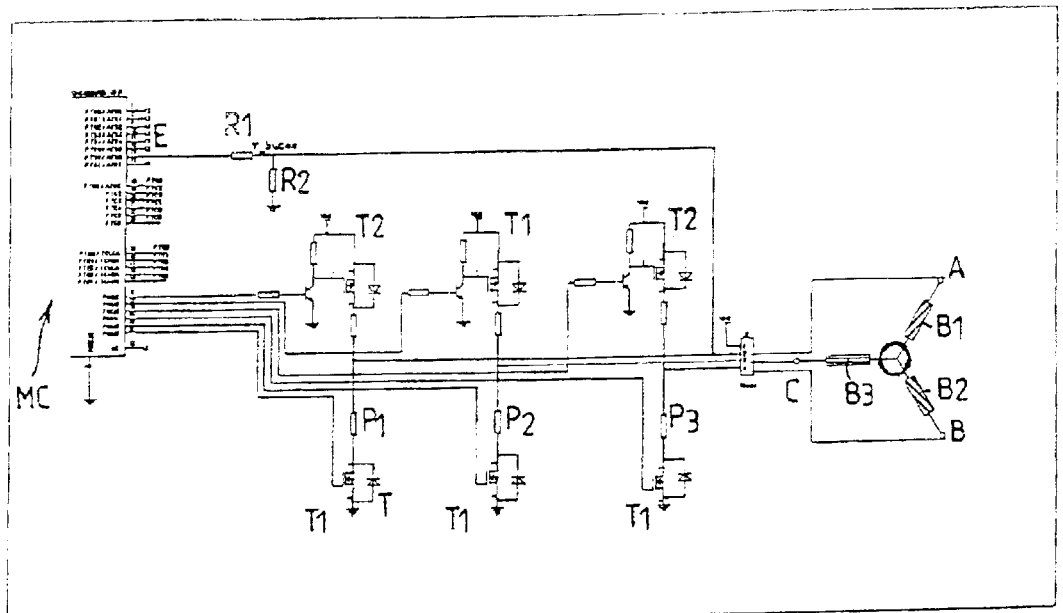
FIG. 7 diagrammatically illustrates the control electronics.

FIG. 7 represents the electronics associated with the end-stop detection. The coil B1 has its drive wire linked to a voltage-divider bridge (R1, R2). This bridge serves to bring down the level of the signal to a level which is acceptable for the analysis electronics not to be damaged (under +5 Volts), and this in the worst case (U=+16 Volts). This bridge is connected to an analogue input E of a drive device, such as a local microcontroller MC, allocated to the motor M and which is the electronic element for processing of the signal originating from this bridge.

By integrating these electronics MC directly onto the motor M and linking them, via a bus, to a control device, for example a microcontroller MMC which supervises the application, for example a heating and/or air-conditioning installation, the problem of overloading of this control device is addressed. This is because the system supervisor MMC is informed, by way of the bus, only when the end stop is detected. Conversely, the supervision microcontroller MMC only sends the drive command for positioning of the motor M, but not the entire sequencing of the steps, which is generated locally by the microcontroller MC.

FIG. 8 shows the form of the signal in the 2 cases, in which the motor is at the end stop and when it is not. The microcontroller MC compares the voltage levels of the coil with one or two thresholds S1 and/or S2 when the drive is at high impedance. In the two cases, transition spikes TP are produced. These spikes cross the analysis thresholds S1 and/or S2. It is therefore necessary to carry out the sampling of these signals after these spikes TP have passed. This waiting time is a function of the impedances of the various elements.

When the upper threshold is exceeded and/or the lower threshold is crossed, end-stop detection is signalled. These thresholds have to be chosen so that they are meaningful. They are determined by experimentation. Several sampling operations can be instigated during each high-impedance state.

It is necessary, nevertheless, to compensate for the fact that the supply voltage can vary independently of end-stop blocking, since a variation in the threshold-voltage levels is the result. It is therefore necessary to adjust the threshold-voltage level(s) as a function of the supply voltage of the motor. The higher the supply level, the more the upper threshold will have to be raised and the lower threshold lowered, for example by adjusting the threshold voltage proportionally to the supply voltage.

In the event of detection of blocking, it is possible to take action on the drive to the motor, so as to attenuate it or else to dispense with it. Action can be taken, for example, on the torque of the motor, especially by progressively altering the duty cycle in the case of a pulse-width modulated (PWM) drive, or else temporarily to suspend the drive to the motor. This makes it possible to avoid the rebound or to attenuate it, and, if appropriate, to diminish the oscillatory effect on the motor proper.

What is claimed is:

1. Method of detecting the blocking of a three-phase stepper motor featuring three coils, characterised in that, with the stepper motor (M) having its coils connected in star mode, with a common terminal (P), it implements a detection of a said blocking of the rotor of the motor, by supplying two of the said coils (A, B) with electricity in such a way that they are traversed by a current, and by measuring the voltage at an end terminal of the third coil (C), as well as by carrying out a comparison of the voltage measured with at least one given threshold (S1, S2).

2. Method according to claim 1, characterised in that the said comparison is carried out with a maximum threshold (S1).

3. Method according to claim 1, characterised in that the said comparison is carried out with a minimum threshold (S2).

4. Method according to claim 1, characterised in that the coils are supplied from their terminal (A, B, C) opposite the said common terminal (P), and in that, in order to carry out the said detection, a first terminal (A) is taken to a first supply voltage, a second terminal (B) is taken to a second supply voltage, and a third terminal (C) is coupled to a voltage-measuring device.

5. Method according to claim 1, characterised in that the said voltage measurement is carried out by sampling.

6. Method according to claim 5, characterised in that the sampling is carried out offset in time with a motor-step drive, the said offset being chosen in such a way as to identify a blocking of the rotor of the motor (M), while avoiding the switching spikes (TP).

7. Method according to claim 1, characterised in that the said blocking of the motor is the arrival of an element moved by it against an end stop.

8. Method according to claim 7, characterised in that it implements an adjustment of at least one threshold (S1, S2) as a function of a supply voltage of the motor.

9. Method according to claim 1, characterised in that, in the event of detection of blocking, the drive to the motor (M) is attenuated, or even dispensed with.

10. Device for detecting the blocking of a three-phase stepper motor, characterised in that it includes:
    an electronic module for supplying the motor in star mode,
    an electronic blocking-detection module for supplying two coils (A, B) of the motor (M) in such a way that they are traversed by a current while a third coil is coupled to a measurement input of the electronic module.

11. Device according to claim 10, characterised in that the electronic supply module and/or the electronic detection module are controlled by a drive device associated with the stepper motor.

* * * * *